(12) United States Patent
Dhandu et al.

(10) Patent No.: US 11,452,044 B2
(45) Date of Patent: Sep. 20, 2022

(54) POWER MANAGEMENT OF AN IOT TRACKER

(71) Applicant: Verizon Patent and Licensing Inc., Basking Ridge, NJ (US)

(72) Inventors: Siva Sandeep Dhandu, Princeton, NJ (US); Yuk Lun Li, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 16/995,736

(22) Filed: Aug. 17, 2020

(65) Prior Publication Data

US 2020/0383057 A1 Dec. 3, 2020

Related U.S. Application Data

(63) Continuation of application No. 15/154,894, filed on May 13, 2016, now Pat. No. 10,785,723.

(51) Int. Cl.

| | |
|---|---|
| *H04W 52/02* | (2009.01) |
| *H04W 4/21* | (2018.01) |
| *H04W 4/70* | (2018.01) |
| *H04W 64/00* | (2009.01) |
| *H04W 68/00* | (2009.01) |
| *H04W 88/02* | (2009.01) |
| *H04W 4/021* | (2018.01) |

(52) U.S. Cl.
CPC ....... *H04W 52/0258* (2013.01); *H04W 4/021* (2013.01); *H04W 4/70* (2018.02); *H04W 64/006* (2013.01); *H04W 68/00* (2013.01); *H04W 88/02* (2013.01); *Y02D 30/70* (2020.08)

(58) Field of Classification Search
CPC ... H04W 52/0258; H04W 4/021; H04W 4/70; H04W 64/006; H04W 68/00
See application file for complete search history.

(56) References Cited

U.S. PATENT DOCUMENTS

| | | | | |
|---|---|---|---|---|
| 9,443,410 | B1* | 9/2016 | Constien | G08B 21/043 |
| 9,642,529 | B1* | 5/2017 | Siddiqui | A61B 5/02444 |
| 2011/0054780 | A1* | 3/2011 | Dhanani | H04W 4/023 |
| | | | | 701/465 |
| 2011/0227722 | A1* | 9/2011 | Salvat, Jr. | G16H 40/20 |
| | | | | 340/539.1 |
| 2012/0036198 | A1* | 2/2012 | Marzencki | H04B 17/27 |
| | | | | 709/206 |

(Continued)

*Primary Examiner* — Asghar H Bilgrami

(57) ABSTRACT

Techniques described herein may be used to conserver battery power of an Internet of Things (IoT) tracker by increasing the overall amount of time that the IoT tracker is in a battery conservation mode (a sleep mode, a Power Save Mode (PSM), etc.). An IoT tracker may implement a battery conservation policy that may include instructions that cause the IoT tracker to monitor certain conditions, determine when the conditions satisfy a particular trigger, and implement a battery conservation mode in response to those conditions. Examples of such conditions may include (1) the IoT tracker being close to a user device designated to track the location of the IoT tracker, (2) identifying that a current time and day are associated with a pre-selected schedule for disabling tracking services, (3) the IoT tracker being located within a particular geographic area, and more.

20 Claims, 10 Drawing Sheets

(56) References Cited

U.S. PATENT DOCUMENTS

| | | | |
|---|---|---|---|
| 2015/0099472 A1* | 4/2015 | Ickovic | A01K 15/021 |
| | | | 455/66.1 |
| 2016/0007288 A1* | 1/2016 | Samardzija | H04W 52/0229 |
| | | | 370/311 |
| 2016/0129960 A1* | 5/2016 | Akins | H04W 4/02 |
| | | | 340/427 |
| 2016/0249174 A1* | 8/2016 | Patel | A61B 5/01 |

* cited by examiner

Schedule-Based Battery Conservation

| Day | Time | Location | Mode |
|---|---|---|---|
| Monday | 9AM-3PM | School | PSM |
| Tuesday | 9AM-3PM | School | PSM |
| Wednesday | 9AM-3PM | School | PSM |
| Wednesday | 9-10AM | Work | Sleep Mode |
| Thursday | 9AM-3PM | Work | PSM |
| Friday | 9AM-3PM | School | PSM |
| Sunday | 9-10AM | Church | Sleep Mode |
| ... | ... | ... | ... |

Fig. 6

POWER MANAGEMENT OF AN IOT TRACKER

CROSS-REFERENCE TO RELATED APPLICATION

This Application is a Continuation of U.S. patent application Ser. No. 15/154,894, filed on May 13, 2016, titled "POWER MANAGEMENT OF AN IoT TRACKER," the contents of which are herein incorporated by reference in their entirety.

BACKGROUND

Wireless telecommunication networks often include user equipments (UEs) that connect to Radio Access Networks (RANs) of the wireless telecommunication network. The UE may include user devices, such as smartphones, tablet computers, etc., and Internet of Things (IoT) devices (also referred to as Machine Type Communication (MTC) devices and Machine-to-Machine (M2M) devices). An example of an IoT device may include Category 1 (CAT 1) trackers (also referred to as an IoT tracker). IoT trackers may be used, for example, to communicate with a wireless telecommunications network to track the location of the IoT tracker itself and/or an object to which an IoT tracker is attached. Due to the mobile nature of an IoT tracker, an IoT tracker may often include a small batter powered device.

In operation, an IoT tracker may periodically determine a current geographic location (e.g., via Global Positioning System (GPS), Observed Time Difference of Arrival, etc.) of the IoT tracker and provide the location to a user device, or another device, via the wireless telecommunication network. In this manner, the movements of an IoT tracker, and hence the movement of the object to which the IoT tracker is attached, may be monitored.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 6 illustrates an example schedule that may be used to implement a schedule-based battery conservation policy;

DETAILED DESCRIPTION OF PREFERRED EMBODIMENTS

Figure 1:
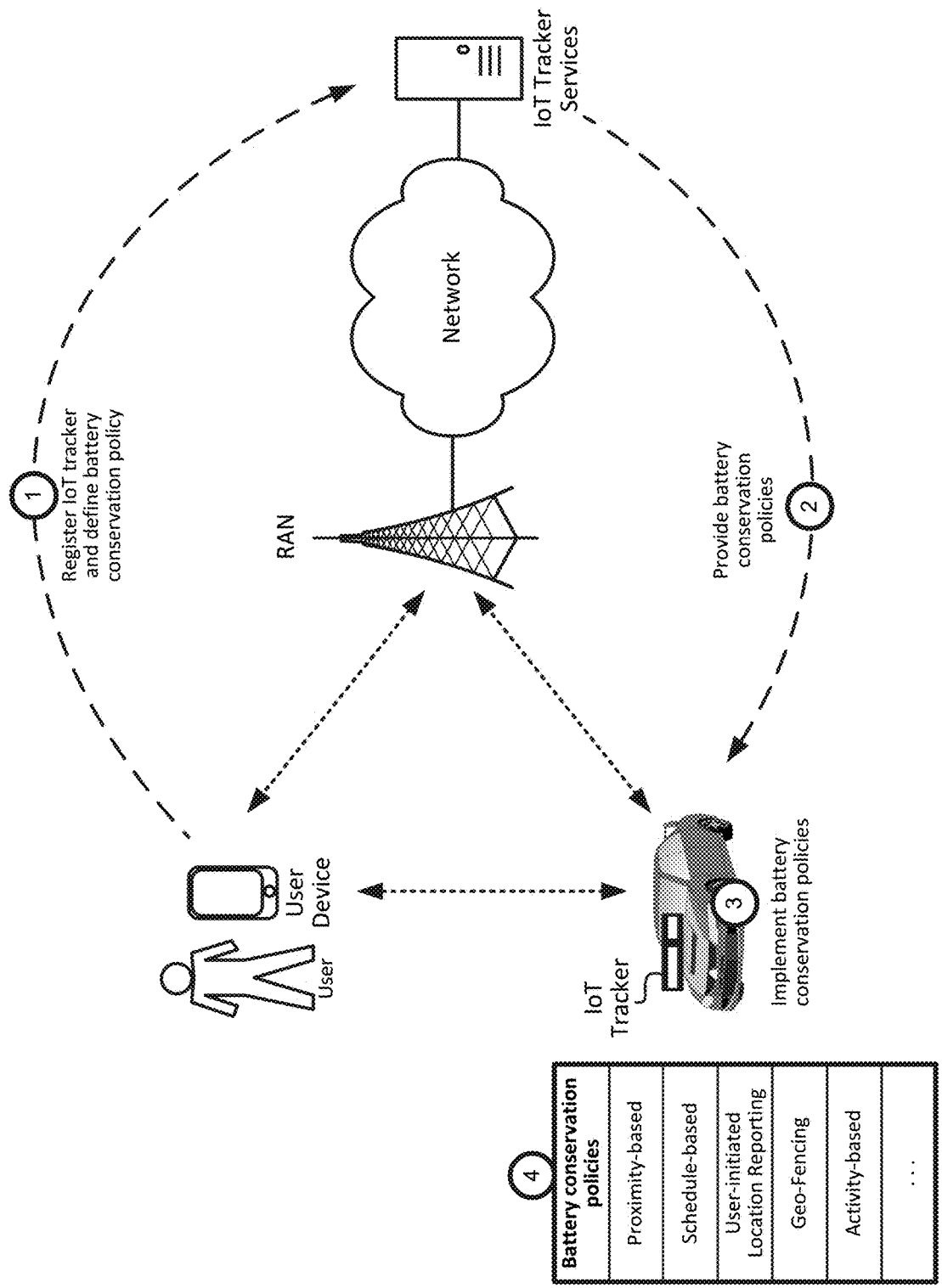
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

A UE, such as an IoT tracker device, may rely on a power source, such as a battery, in order to function. Once the battery is depleted, the IoT tracker may cease to operate until the battery is recharged or replaced. In order to preserve battery power, the IoT tracker may periodically enter into battery conservation mode, which may include a sleep mode, a Power Save Mode (PSM), etc. Since location services and other types of network services often require a significant amount of power, a battery conservation mode may be directed at limiting communications between the IoT tracker and external networks (as opposed to, for example, processes that are completely internal to the IoT device).

As used herein, a sleep mode may include a mode of operation where an IoT tracker communicates with the network periodically. An example of a sleep mode may include enhanced discontinuous reception (eDRX) mode. In such a mode, the IoT tracker may notify the network when the IoT tracker will listen for communications from the network to find out about whether there is important information for the IoT tracker to receive. Between "listening" moments, the IoT tracker may disable receiver functions in order to conserver power. During a listening moment, the IoT tracker may re-enable the receiver functions and listen for notification about information for the IoT tracker to receive/obtain from the network. If such a notification is not received, the IoT tracker may reenter the sleep mode. However, if such a notification is received, the IoT tracker may communicate with the network in order to receive the information. In a sense, therefore, the network may cause the IoT tracker to awaken from a sleep mode by informing the IoT device, during "listening" moments, about information that is available from the network.

By contrast, when an IoT tracker enters into a PSM, the IoT tracker may remain registered with the network (e.g., have no need to re-attach to the network, reestablish packet data network (PDN) connections, etc.), however, the IoT tracker may be unavailable to the network for the duration of the PSM. For instance, the IoT tracker may discontinue monitoring for paging signals from the network and turn off all non-critical functionally. Some of the disabled features or functions may include location services, mobile data services, and other services that tend to use a lot of battery power.

Before entering the PSM, the IoT tracker may notify the network about how long the PSM will last, and the IoT tracker may stay in the PSM until the stated duration has expired or a user provides a command for the IoT tracker to exit the PSM. While in the power save mode, the network may not prompt or cause the IoT tracker to exit the PSM. Once the IoT tracker exits the PSM, the features and/or processes that were disabled as a result of entering into the PSM may be resumed (regardless of whether the network has informed the IoT tracker of important information that the network has for the IoT tracker). In some implementations, the IoT tracker may enter into a PSM after being in a normal idle mode for a period of time (e.g., a mode of operation that may be limited to rudimentary operations such as monitoring for paging signals from the network).

Techniques described herein may be used to conserver battery power of an IoT tracker by increasing the overall amount of time that the IoT tracker is in a battery conservation mode (a sleep mode, a PSM, etc.). For instance, the techniques described herein may enable IoT trackers to implement battery conservation policies that may include instructions that cause the IoT tracker to monitor certain conditions, determine when a particular condition, trigger, or threshold has been reached with respect to those conditions, and implement an appropriate battery conservation mode in response to those conditions. Examples of such conditions may include (1) the IoT tracker being close to a particular device (e.g., a user device) designated to track the location of the IoT tracker, (2) identifying that a current time and day are associated with a pre-selected schedule for disabling tracking services, (3) the IoT tracker being located within a particular geographic area (e.g., a location where tracking is unnecessary), and more.

FIG. 1 illustrates an example overview of an implementation described herein. As shown, a user device (e.g., a smartphone, a tablet computer, etc.) may communicate, via a Radio Access Network (RAN) with a server that provides IoT tracker services. The user device may register, with the server, an IoT tracker that is installed in a vehicle, and may also define battery conservation policies for the IoT tracker (at 1). The battery conservation policies may be provided, via the RAN, to the IoT tracker (at 2). The IoT tracker may implement the battery conservation policies in order to conserve battery power and, thereby, extend the overall life of the battery (at 3).

As described herein, a battery conservation policy may include rules and instructions to conserve the power of a battery of an IoT tracker by, for example, causing the IoT tracker to enter into a battery conservation mode (e.g., a sleep mode, a PSM, etc.) in response to certain conditions that are specified by the battery conservation policy. FIG. 1 provides a list of examples of battery conservation policies (at 4). In one example, a battery conservation policy may include a proximity-based policy, such that the IoT tracker may enter into a battery conservation mode whenever a particular device (such as a user device registered to track the IoT tracker) is within close proximity of the IoT tracker. As another example, a battery conservation policy may include a schedule-based policy, where the IoT tracker may enter into a battery conservation mode at a particular time (e.g., while a user or device to which the IoT tracker is attached is at school, work, church, etc.).

In another example, a user-initiated location reporting policy may cause the IoT tracker to remain in a battery conservation mode unless/until a user inputs a command for the IoT tracker to determine and/or communicate the location of the IoT tracker. In yet another example, a geo-fencing policy may be used to cause the IoT tracker to enter into a battery conservation mode whenever the IoT tracker is located inside of a pre-defined geographic area, such as a home, a neighborhood, a commercial center, a city, a county, etc. A battery conservation policy may also include an activity-based policy, where the IoT tracker will monitor whether the IoT tracker is moving. When the IoT tracker is stationary, the IoT tracker may enter into a battery conservation mode; however, when the IoT tracker begins moving, the IoT tracker may exit the battery conservation mode and resume with determining and communicating the location of the IoT tracker.

An example of a battery conservation policy may include postponing the implementation of a battery conservation mode when the IoT tracker is connected to an external power source. For instance, the IoT tracker may have a local battery designated exclusively to the IoT tracker. When the IoT tracker must use the local battery, the IoT tracker may implement a battery conservation policy. However, when the IoT tracker begins operating based on an external power source, such as the battery of a vehicle, an AC electrical outlet, etc., the IoT tracker may not enter into a battery conservation mode because such a mode may not be beneficial to conserving the power of the battery of the IoT tracker.

Figure 2:
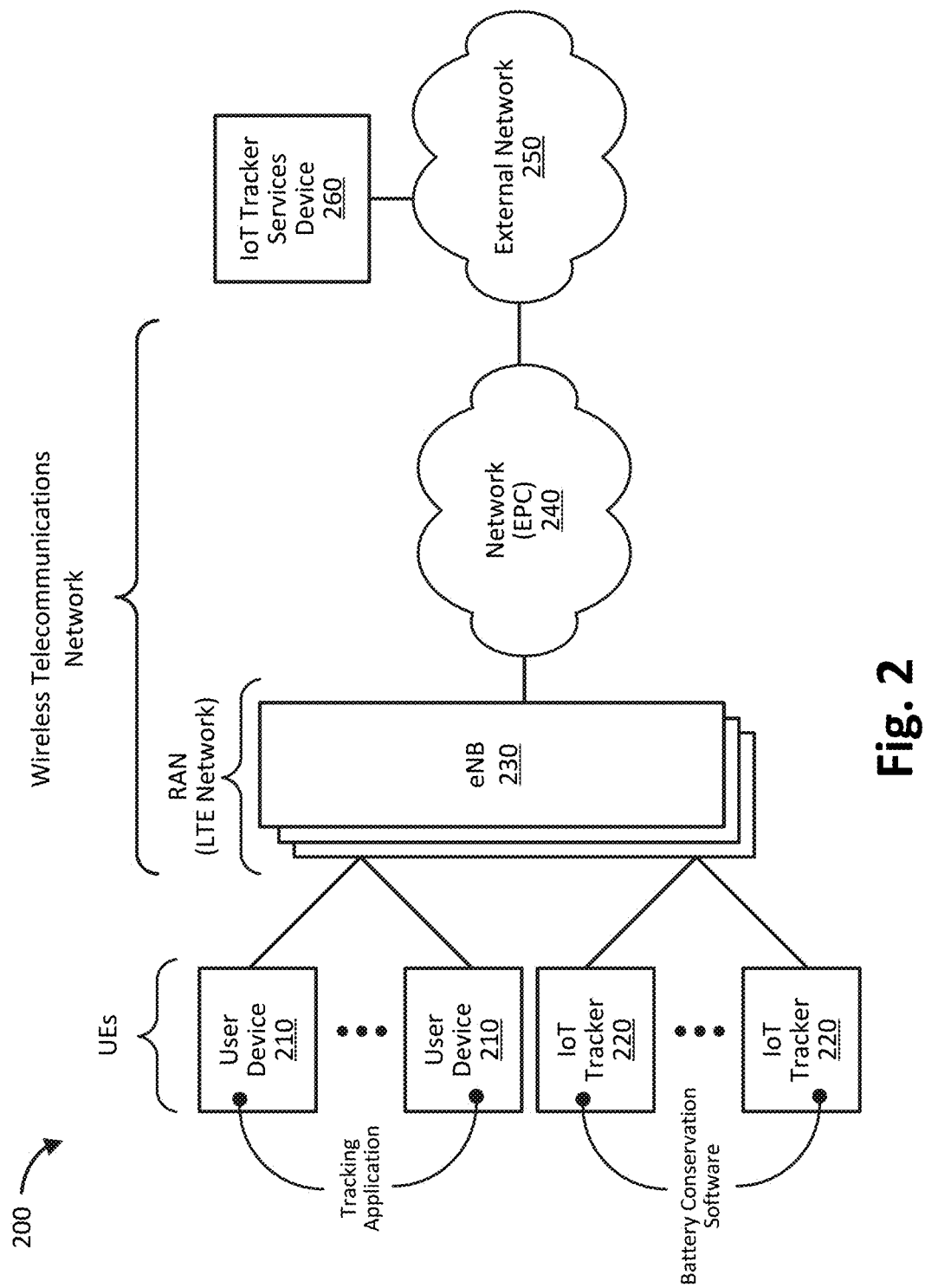
FIG. 2 is a diagram of an example environment in which systems and/or methods described herein may be implemented.

FIG. 2 is a diagram of an example environment 200 in which systems and/or methods described herein may be implemented. Environment 200 may include UEs (e.g., user devices 210, IoT trackers 220, etc.), a wireless telecommunications network, external network 250, and IoT tracker services device 260. The wireless telecommunications network may include a Long-Term Evolution (LTE) network and EPC 240. The LTE network may include a RAN consisting of one or more base stations, some or all of which may take the form of enhanced node Bs (eNBs) 230, via which UEs may communicate with the EPC 240.

User device 210 may include a portable computing and communication device, such as a personal digital assistant (PDA), a smart phone, a cellular phone, a laptop computer with connectivity to the wireless telecommunications network, a tablet computer, etc. User device 210 may also include a non-portable computing device, such as a desktop computer, a consumer or business appliance, or another device that has the ability to connect to a RAN of the wireless telecommunications network. User device 210 may also include a computing and communication device that may be worn by a user (also referred to as wearable devices) such as a watch, a fitness band, a necklace, glasses, an eyeglass, a ring, a belt, a headset, or another type of wearable device.

As shown, user device 210 may include a tracking application that enables user device 210 to track the geographic locations of IoT trackers 220 that are registered to user device 210. The tracking application may be downloaded and installed from IoT tracker services device 260 or from another source. User device 210 may register IoT trackers 220 by accessing a web portal, via the tracking application or another type of application (e.g., a web browser), hosted by IoT tracker services device 260. Similarly, by communicating with IoT tracker services device 260, user device 210 may create battery conservation policies, delete battery conservation policies, and/or edit battery conservation policies that are provided to, and implemented by, IoT trackers 220.

In some implementations, IoT tracker 220 may include a stand-alone Machine-to-Machine (M2M) device or Machine-Type-Communication (MTC) device that may be inserted into, attached to, installed in, etc., another object in order to track the geographic locations of that object. Examples of such an object may include an inanimate object, such as a vehicle, a package, an article of clothing (e.g., a purse, a pant pocket, a backpack, etc.), a user device, etc., and/or an animate object, such as people and/or animals. In some implementations, IoT tracker 220 may be attached to one object, such as a collar, and then (in turn)

attached to another object, such as a dog (via the collar), in order to track the movements of the dog.

IoT tracker 220 may include a wireless computing and communication device that may be designed to collect certain types of information (e.g., geographic location information) and send the information to a destination device (e.g., IoT tracker services device 260, user device 210, or another device) via the wireless telecommunications network. In some implementations, IoT tracker 220 may send the information directly to user device 210 via a different network/connection, such as a Bluetooth connection, a WiFi network to which IoT tracker 220 and user device 210 are connected, etc.

As shown, IoT tracker 220 may include battery conservation software, which may enable IoT tracker 220 to download, install, and implement battery conservation policies from IoT tracker services device 260. In some implementations, the battery conservation software may also, or alternatively, enable user device 210 to access IoT tracker 220 (e.g., via a configuration interface made available by IoT tracker 220) in order to create battery conservation policies, delete battery conservation policies, and/or edit existing battery conservation policies. As described above, a battery conservation policy may include information and instructions for IoT tracker 220 to monitor certain conditions, identify when a trigger or threshold has been reached, and implement a battery conservation mode (e.g., a sleep mode, a PSM, etc.) in response to the trigger being satisfied.

eNB 230 may include one or more network devices that receives, processes, and/or transmits traffic destined for and/or received from user device 210 and/or IoT tracker 220 via an air interface. eNB 230 may be connected to a network device, such as site router, that functions as an intermediary for information communicated between UEs and EPC 240. In some implementations, eNB 230, EPC 240, and/or the external network may assist IoT tracker 220 in determining a geographic location of IoT tracker 220 (e.g., via GPS, Observed Time Difference of Arrival, etc.).

EPC 240 may include one or more network devices, some or all of which are similar to network devices provide in a traditional core network of a 3rd Generation Partnership Project (3GPP) Communication Standard. Examples of such network devices may include Serving Gateways (SGWs), a PDNs Gateway (PGWs), Mobility Management Entities (MMEs), Home Subscriber Servers (HSSs), and more. In some implementations, EPC 240 may be connected to one or more additional networks, such as an Internet Protocol (IP) Multimedia Subsystem, Broadcast Multicast networks, and other networks.

External networks 250 may include one or more wired and/or wireless networks. For example, network 240 may include another cellular network (e.g., a second generation (2G) network, a third generation (3G) network, a fourth generation (4G) network, a fifth generation (5G) network, another LTE network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

IoT tracker services system 260 may include one or more computing devices, such as a server device or a collection of server devices, capable of providing support and other services to user device 210 and IoT tracker 220. For instance, user device 210 may download and install one or more software applications from IoT tracker services system 260, which may enable user device 210 to perform one or more of the operations described herein. Examples of such operations may include registering IoT trackers 220, creating battery conservation polices, receiving tracking information from IoT trackers 220, etc. Similarly, IoT tracker services system 260 may enable IoT tracker 220 to download and install one or more software applications from IoT tracker services system 260 or from another device, which may enable IoT tracker 220 to perform one or more of the operations described herein. Examples of such operations may include downloading, creating, and/or implementing battery conservation policies as described herein. IoT tracker services system 260 may also provide facilities to manage the operation of IoT trackers 220, for example via software applications installed in user devices 210 and/or through user interfaces and communications interfaces provided by IoT tracker services system 260 (e.g., web pages, web services, application programming interfaces (APIs), etc.).

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 300. Additionally, the devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

Figure 3:
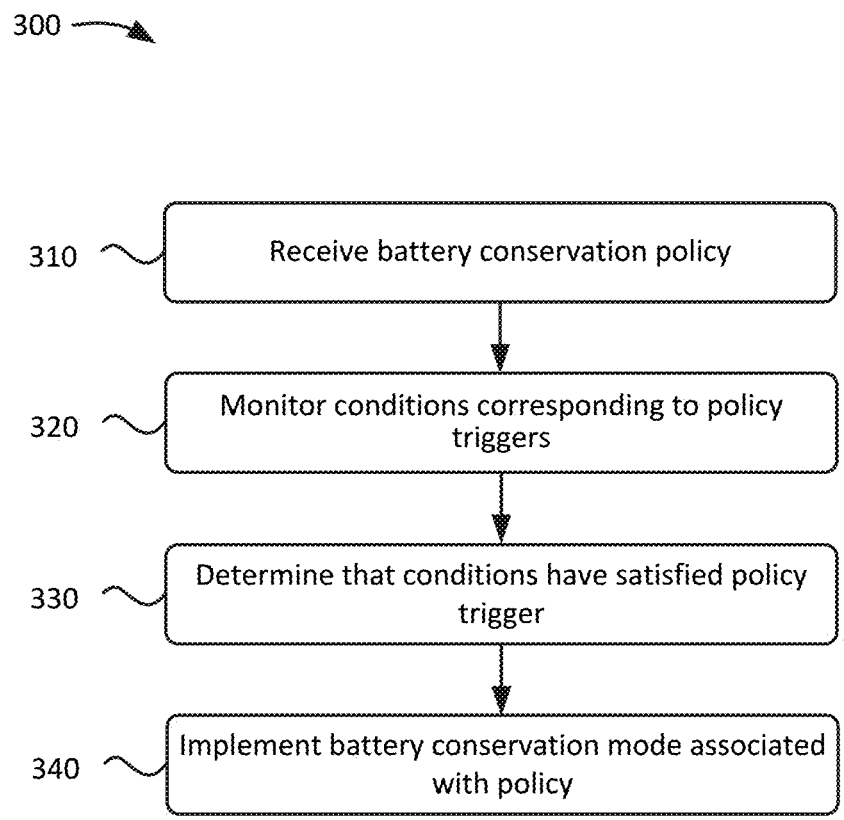
FIG. 3 illustrates an example process for implementing a battery conservation policy.

FIG. 3 illustrates an example process 300 for implementing a battery conservation policy. In some implementations, process 300 may be performed by IoT tracker 220.

As shown, process 300 may include receiving a battery conservation policy (block 310). For example, IoT tracker 220 may receive a battery conservation policy from IoT tracker services device 260. As mentioned above, a user of user device 210 may have created the battery conservation policy. Alternatively, the battery conservation policy may include a battery conservation policy made available to some or all IoT tracker devices 220 by default (e.g., the policy may be provisioned for the IoT tracker during the manufacture of the IoT tracker).

The battery conservation policy may include instructions for IoT tracker 220 to monitor certain conditions, identify when a trigger or threshold has been reached, and implement a prescribed battery conservation mode (e.g., a sleep mode, a PSM, etc.). For example, the battery conservation policy may include instructions for IoT tracker 220 to monitor a level of activity of the IoT tracker 220, determine whether the level of activity falls below a particular threshold, and enter into a sleep mode or a PSM in response to the activity level falling below the threshold. Several examples of the instructions and information that may define a battery conservation policy are discussed below with reference to FIGS. 4-8.

Process 300 may include monitoring conditions corresponding to policy triggers (block 320). For instance, IoT tracker 220 may collect information that corresponds to conditions or triggers associated with the battery conservation policy. Examples of such information may include a distance between a particular user device 210 (that is monitoring the location of IoT tracker 220) and the IoT tracker 220 itself, a current date and time that corresponds to a scheduled date and time for implementing a battery conservation mode, a location of IoT tracker 220 (e.g., with reference to a geographic area and/or boundary). Additional examples are discussed below with reference to FIGS. 4-8.

Process 300 may include determining that the monitored conditions have satisfied the policy trigger (block 330). For example, IoT tracker 220 may compare the monitored conditions to the policy trigger, defined by the battery conservation policy, and determine that the monitored conditions have satisfied the policy trigger. For instance, if the policy trigger is that IoT tracker 220 is not to leave a particular geographic area then IoT tracker 220 may determine that the policy trigger is satisfied upon detecting that IoT tracker 220 has left the particular geographic area. As another example, if the policy trigger is that IoT tracker 220 may enter a battery conservation mode when the IoT tracker 220 is no longer moving, IoT tracker 220 may determine that the policy trigger is satisfied upon detecting accelerometer readings that are below a threshold level of accelerometer activity. Additional examples are discussed below with reference to FIGS. 4-8.

Process 300 may include implementing a battery conservation mode that is associated with the battery conservation policy (block 340). For example, IoT tracker 220 may enter into a battery conservation mode associated with the battery conservation policy. In implementations, where the battery conservation policy includes different policy triggers that can trigger different battery conservation modes (one mode being a sleep mode and the other mode being a PSM), IoT tracker 220 may enter into a battery conservation mode associate with a particular (i.e., whichever) policy trigger that was satisfied by the monitored conditions. IoT tracker 220 may communicate its entry into a particular battery conservation mode to the network as noted above. In some implementations, IoT tracker 220 may communicate its entry into a battery conservation mode to a user device 210 that is associated with IoT tracker 220. For example, IoT tracker 220 may communicate that it has entered a battery conservation mode, the type of battery conservation mode, and/or the trigger that caused the entry to battery conservation mode. The communication may be to the user device 210 directly (e.g., via the networking facilities of FIG. 2) or through communication with the IoT tracker services system 260.

In some implementations, prior to entering into a power conservation mode, IoT tracker 220 may communicate with user device 210 in order to have the user of user device 210 confirm whether IoT tracker 220 may enter into the power conservation mode. If IoT tracker 220 receives such confirmation, IoT tracker 220 may proceed by entering into the power conservation mode. If IoT tracker 220 does not receive such a confirmation, IoT tracker 220 may refrain from entering into the power conservation mode (e.g., for a period of time).

Figure 4:
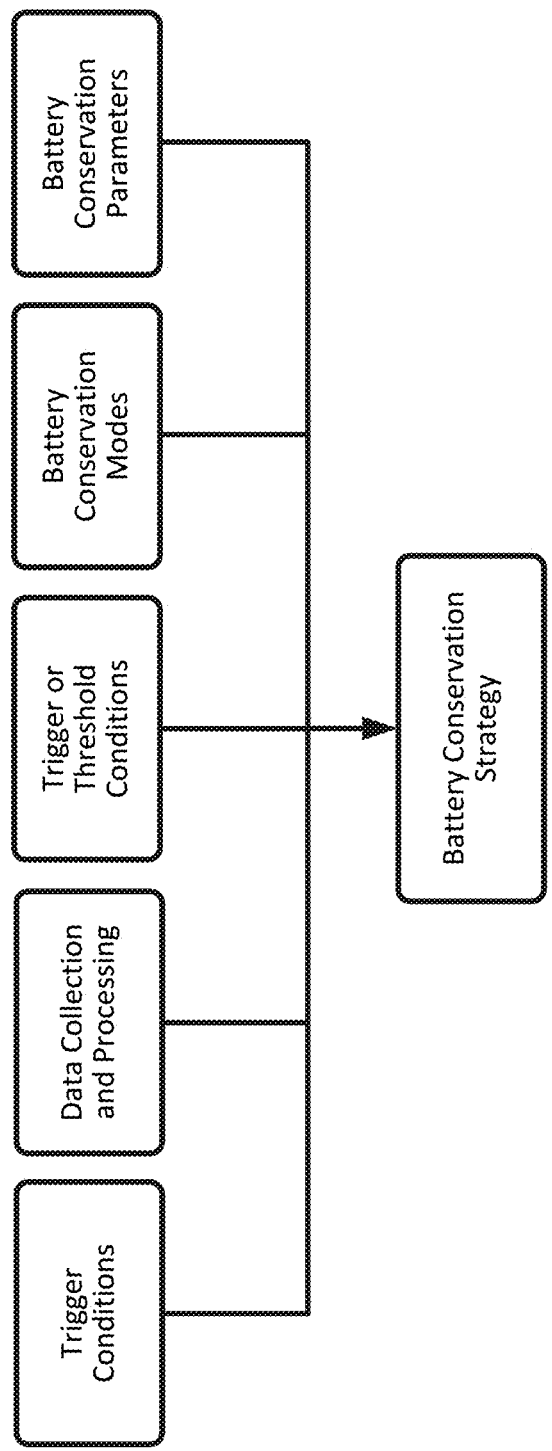
FIG. 4 illustrates an example of instructions and information that may be included in a battery conservation policy.

FIG. 4 illustrates an example of instructions and information that may be included in a battery conservation policy. As shown, a battery conservation policy may include trigger conditions, data collection and processing instructions, triggers or threshold conditions, battery conservation modes, and battery conservation parameters. In some implementations, a battery conservation policy may include fewer instructions and/or information; different instructions and/or information; or differently arranged instructions and/or information than what is illustrated in FIG. 4. The scope of the techniques described herein may also include battery conservation policies that are complex and may include multiple conditions, thresholds and triggers, different battery conservation modes, various battery conservation parameters, etc.

Trigger conditions may include a condition or set of conditions that may cause IoT tracker 220 to enter into a battery conservation mode associated with that condition or set of conditions. Examples of trigger conditions may include proximity-based conditions, schedule-based conditions, user-initiated location reporting, geo-fencing conditions, activity-based conditions, and more.

Proximity-based conditions may include a geographic distance between a current location of a user device 210 that is monitoring the location of IoT tracker 220 and the current location of the IoT tracker 220 itself. For instance, if IoT tracker 220 is attached to a dog collar, in order to enable an owner of the dog to use his or her user device 210 to track the current location of the dog, the trigger condition may be a particular distance (e.g., 15 feet) between the IoT tracker 220 on the dog and the user device 210 of the owner. As such, if/when the owner is within 15 feet of the dog, IoT tracker 220 may enter into a battery conservation mode (e.g., a sleep mode, a PSM, etc.) in order to conserve the battery power of IoT tracker 220. The notion behind such a trigger condition may be that if the owner is within 15 feet of the dog, the owner should know (e.g., be able to see) the physical location of the dog and, therefore, there is no need for the IoT tracker 220 to waste the battery power that would be required to notify the owner of the location of the dog.

Scheduled-based conditions may include scenarios in which the location of a particular IoT tracker 220 may be assumed because of a schedule associated with the particular IoT tracker 220. For example, a parent may attach IoT tracker 220 to a backpack of his or her child, and may create a battery conservation policy for IoT tracker 220 that takes advantage of the known school schedule of the child. If the parent already knows that the child will be at school from 9:00 AM to 3:00 PM from Monday to Friday, a trigger condition may be created to cause IoT tracker 220 to enter into a battery conservation mode from Monday to Fridays between the hours of 9:00 AM and 3:00 PM.

User-initiated location reporting may include a trigger condition that may cause IoT tracker 220 to actually discontinue a battery conservation mode. For example, a hiker may embark on an extended hike that does not require him or her to transmit their current location on a frequent basis. Because of the remoteness of his or her location, transmission of their location may require considerable battery power. As a result, it may be advantageous to have the IoT tracker 220 default to a battery conservation mode, such that the IoT tracker 220 may only transmit location information upon a specific command from the user to do so.

Geo-fencing may include designating geographic areas as trigger conditions for entering into (or exiting out of) battery conservation modes. For example, a parent may place an IoT tracker 220 in a pant pocket of his or her child and allow the child to play in a yard, a neighborhood, or another geographic area defined by the parent. In such a scenario, so long as the child (i.e., the IoT tracker 220) remains within the designated area, the IoT tracker 220 may remain in a battery conservation mode (e.g., a sleep mode). If/when, however, the child leaves the designated area, the IoT tracker 220 may exit the battery conservation mode and begin transmitting the geographic location of the child. If the child were to return to the designated area, the IoT tracker 220 may once again enter into a battery conservation mode. In this manner, geographic boundaries may be designated as trigger conditions for causing IoT tracker 220 to enter into, or exit out of, a battery conservation mode.

An activity-based trigger-condition may be based on whether IoT tracker 220 is moving. For instance, an IoT tracker 220 that is placed on a vehicle may monitor (e.g., via an accelerometer or another device of IoT tracker 220) if/when IoT tracker 220 is in motion. So long as the vehicle is in motion, IoT tracker 220 may transmit the movements of IoT tracker 220. However, if/when the vehicle stops, IoT tracker 220 may enter into a battery conservation mode since there may be no need to track the movements of a vehicle that isn't move.

Data collection and processing may include instructions about what types of information should be collected and/or how such information should be processed in order to properly implement a particular battery conservation policy. In some implementations, such instructions may depend on the trigger conditions that are defined for the battery conservation policy and/or whether IoT tracker 220 is currently implementing a battery conservation mode. For example, the data collection and processing instructions for a schedule-based trigger condition may monitor a current date and time and whether the current date and time bears any significance on a schedule designated for IoT tracker 220. As another example, the data collection and processing instructions for a proximity-based trigger condition may include receiving a location of UE 210, determining a location of IoT tracker 220, and determining a distance between user device 210 and IoT tracker 220. In another example, the data collection and processing instructions for a geo-fencing trigger condition may include monitoring the current location of Iot tracker 220 and determining whether the current location is inside of, or outside of, a designated geographic area. As such, data collection and processing may include instructions about what types of information should be collected and/or how such information should be processed in order to properly implement a particular battery conservation policy.

Trigger or threshold information may include a description of a condition that may cause IoT tracker 220 to enter into a battery conservation mode (or to discontinue a battery conservation mode). For example, the threshold information for a proximity-based trigger condition may include a distance (e.g., 10 feet). When the distance between user device 210 and IoT tracker 220 is less than (or equal to) 10 feet, IoT tracker 220 may initiate a battery conservation mode; however, if/when the distance between user device 210 and IoT tracker 220 is greater than 10 feet, IoT tracker 220 may discontinue the battery conservation mode. As another example, if the trigger condition is an activity-based condition trigger, the threshold information may include a change acceleration that is greater than a threshold level of acceleration. For example, if IoT tracker 220 is attached to a child's backpack, the backpack may remain stationary while the child is at school; however, once school is over, the child may tend to leave the school with the backpack, which will register a change in acceleration that is above an acceleration threshold indicative of movement.

A battery conservation mode may include rules and instructions that are designed to limit the amount of battery power being used by IoT tracker 220. As mentioned above, examples of battery conservation modes may include a sleep mode (e.g., eDRX) and a PSM. In some implementations, certain battery conservation modes may be more suitable for certain trigger conditions. For example, a sleep mode may be more suitable for geo-fencing type scenario because using a sleep mode may cause IoT tracker 220 to periodically check whether or not the IoT tracker 220 has crossed the geo-fence. By contrast, PSM may be advantageous for a scenario involving an activity-based trigger because, even while IoT tracker 220 is in a PSM, IoT tracker 220 may continue to receive input from an accelerometer of IoT tracker 220.

Battery conservation parameters may include details about implementing a particular battery conservation mode. For example, battery conservation parameters may include information about how long to stay in a PSM (e.g., during a schedule-based trigger condition, an activity based trigger condition, etc.). Another example may include how much time (e.g., in sleep mode, eDRX mode, etc.) should IoT tracker 220 wait before checking with the network about available information, what types of information from the network is important enough (e.g., IoT tracker 220 an updated battery conservation policy) to cause IoT tracker 220 to wake up from a sleep mode, etc.

Figure 5:
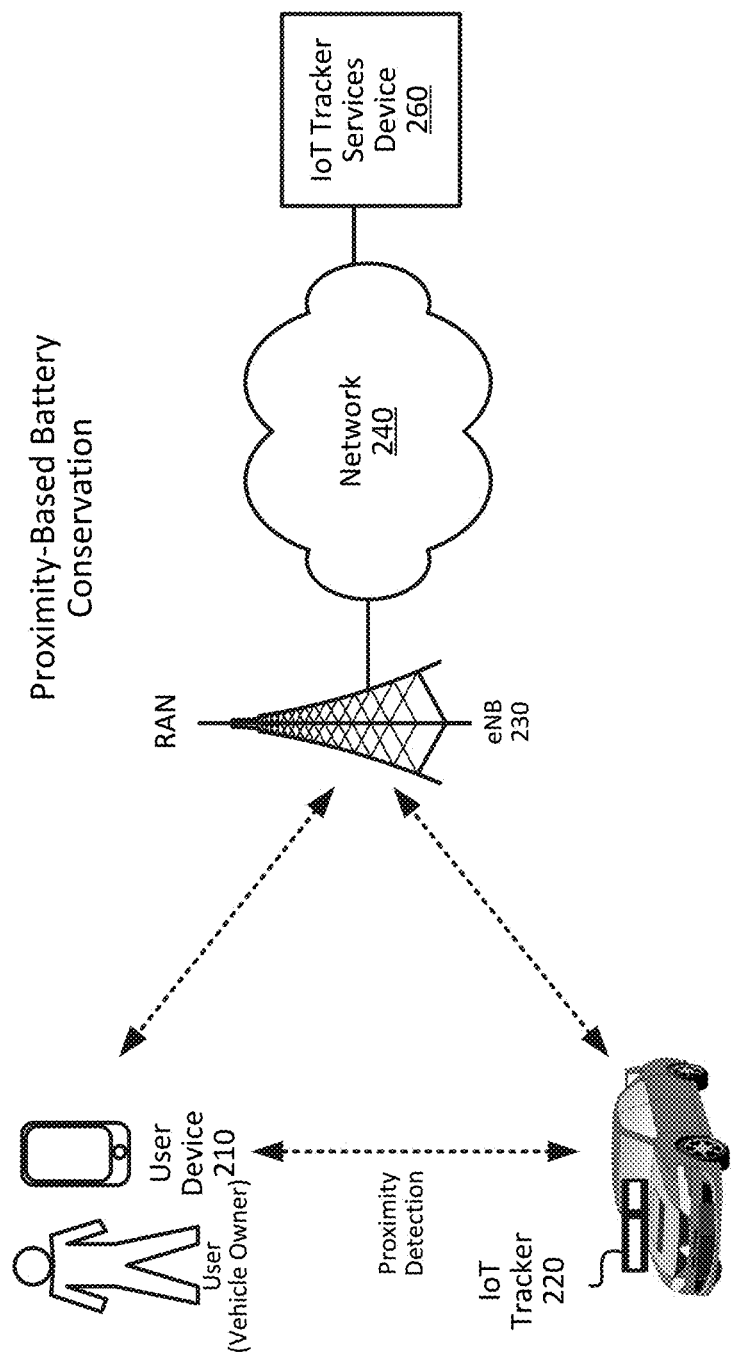
FIG. 5 illustrates an example for implementing a proximity-based battery conservation policy.

FIG. 5 illustrates an example for implementing a proximity-based battery conservation policy. As shown, the example of FIG. 5 may include user device 210, IoT tracker 220, eNB 230, network 240, and IoT tracker services device 260. Descriptions of the devices and networks of FIG. 5 are provided above with reference to FIG. 2. For the purposes of explaining the example of FIG. 5, assume IoT tracker 220 is installed in the vehicle depicted in FIG. 5, and that the user of user device 210 is the owner of the vehicle.

A proximity-based conservation policy may include a conditions trigger that is based on a distance between user device 210 and IoT tracker 220. When the distance between user device 210 and IoT tracker 220 is greater than a pre-selected threshold, IoT tracker 220 may remain in an active mode by periodically transmitting the geographic location of IoT tracker 220 (and therefore the vehicle) to eNB 230. By contrast, when the distance between user device 210 and IoT tracker 220 is less than (or equal to) a pre-selected threshold, IoT tracker 220 may enter into a battery conservation mode (e.g., a sleep mode or a PSM). As such, when the driver is far away from his or her vehicle, the driver may use the location services and capabilities of user device 210 and IoT tracker 220 in order to locate his or her vehicle. However, once the driver is within the pre-selected threshold distance, the driver may be able to see his or her vehicle and, therefore, no longer require the assistance of user device 210 and/or IoT tracker 220.

The distance between user device 210 and IoT tracker 220 may be determined in a variety of ways. In one implementation, user device 210 and IoT tracker 220 may each determine their respective locations and transmit their locations to a network device, (such as eNB 230 or IoT tracker services system 260), and the network device may calculate the distance between user device 210 and IoT tracker 220 and provide the distance to IoT tracker 220. In some implementations, IoT tracker 220 may determine a location of IoT tracker 220, obtain the location of user device 210 from the network (e.g., eNB 230, IoT tracker services system 260, etc.), and calculate the distance between user device 210 and IoT tracker 220. In some implementations, user device 210 may obtain the location information of user device 210 and IoT tracker 220, calculate the distance there between, and provide the distance to IoT tracker 220. In yet other implementations, IoT tracker 220 may use a low power beacon, such as Bluetooth Low Energy (BTLE) mode, to determine the proximity of user device 210. In such implementations, when user device 210 is detected, IoT tracker 220 may enter into a battery conservation mode.

FIG. 6 illustrates an example schedule that may be used to implement a schedule-based battery conservation policy. As described above, a user of user device 210 (or another type of UE) may communicate with IoT tracker services device 260 to create the schedule, and IoT tracker services device 260 may provide the schedule to IoT tracker 220. In some implementations, the user may instead communicate, via user device 210, directly with IoT tracker 220 to create the schedule.

As shown, the example schedule includes a Day column, a Time column, a Location column, and a Mode column. Each cell in the Day column may include a day of the week, each cell in the Time column may include a time period (e.g., 9 AM-3 PM), and each cell in the Location column may include a geographic area. Additionally, each cell in the Mode column may include a type of battery conservation mode, such as a sleep mode or PSM. The example schedule of FIG. 6 is only one representation of the types of information that may be included in a scheduled-based battery conservation policy. In another implementation, a scheduled-based battery conservation policy may include additional information, fewer information, different information, or differently arranged information.

For purposes of explaining FIG. 6, assume that the example schedule includes a weekly schedule of a teenager that attends high school, has a part-time job, and regularly attends some type of religious service. As such, IoT tracker 220 may enter into a PSM on Monday through Friday, between 9:00 AM and 3:00 PM, because the teenager is at school. On Wednesdays, between 5:00 PM and 10:00 PM the teenager is at work, so IoT tracker 220 may enter into a sleep mode. On Sundays between 9:00 AM and 10:00 PM, IoT tracker 220 may enter a sleep mode because the teenager is in church. As such, scheduling information may be used to implement a battery conservation policy.

In the foregoing description the cells in the Location column were mere descriptions of the teenager's locations at the corresponding days and times. In some implementations, however, the cells in the Location column may instead be requirements (e.g., trigger conditions) of the battery conservation policy. For instance, IoT tracker 220 may only enter PSM on Mondays between 9:00 AM and 3:00 PM, so long as the teenager is located at school. Similarly, IoT tracker 220 may only enter a sleep mode on Wednesdays, between 5:00 PM and 10:00 PM, so long as the teenager is located at work. If the teenager leaves school between the hours of 9:00 AM and 3:00 PM on Monday (or leaves work between the hours of 5:00 PM and 10:00 PM on Wednesday), IoT tracker 220 may exit the PSM (or the sleep mode) and resume tracking the locations of the teenager until, for example, the teenager returns to where the schedule indicates that he or she should be. In this manner, different types of conditions (e.g., schedule conditions and geographic location conditions) may be coupled together to create more complex trigger condition for a battery conservation policy.

Figure 7:
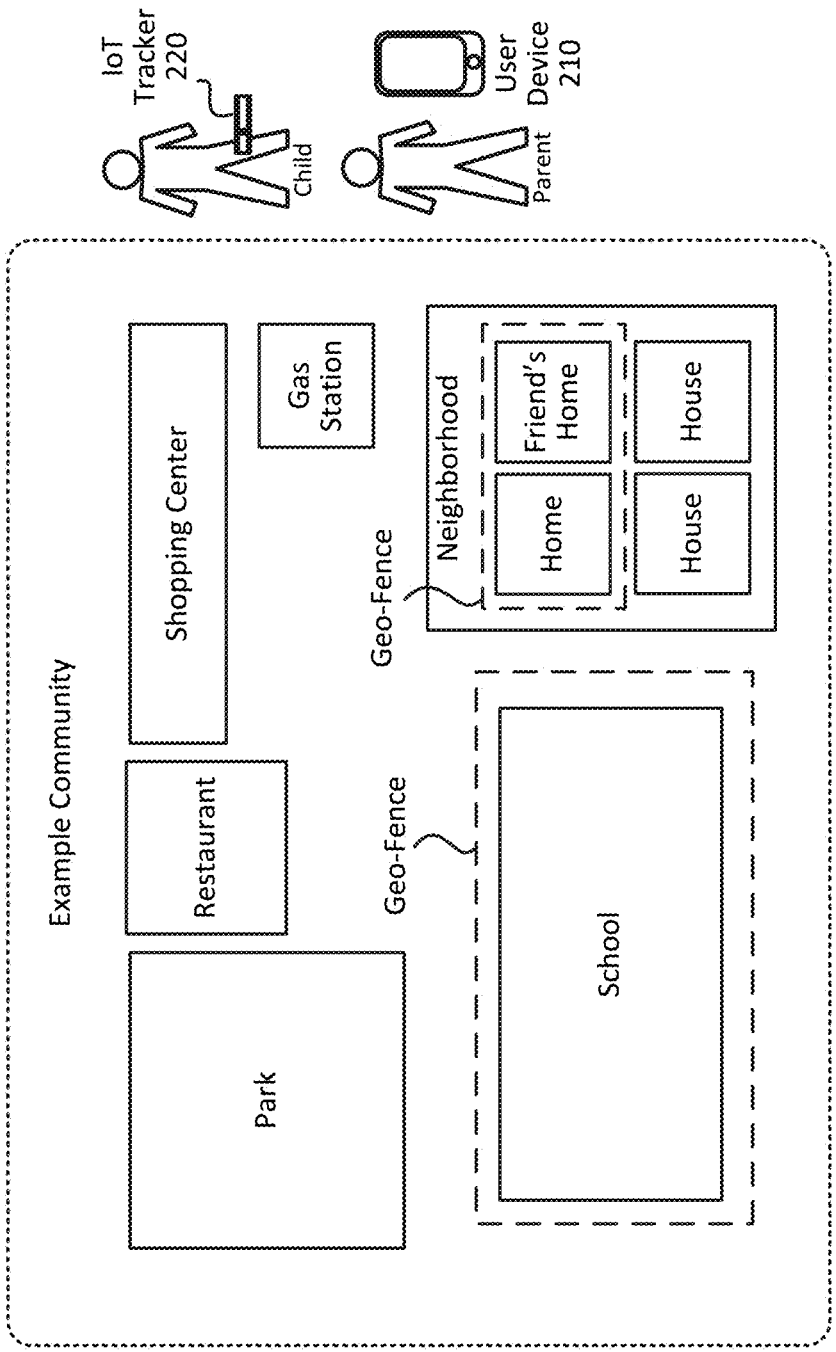
FIG. 7 illustrates an example of using geo-fencing to implement a battery conservation policy.

FIG. 7 illustrates an example of using geo-fencing to implement a battery conservation policy. The example of FIG. 7 depicts a community that includes a park, a restaurant, a shopping center, a gas station, a school, and a neighborhood that includes a home, a friend's home, and two houses. The example of FIG. 7 also includes two geo-fences, one around the school and another around the home and the friend's home. For purposes of explaining FIG. 7, assume that a parent is using a user device 210 to track the geographic location and movements of his or her child via an IoT tracker 220.

As described above, the parent of user device 210 may have created a battery conservation policy for IoT tracker 220, which includes the two geo-fences depicted in FIG. 7. As such, IoT tracker 220 may transmit the location of the child so long as the child does not enter the areas defined by the two geo-fences (i.e., the school or the home and/or friend's home). If the child enters the school, is at home, or is at his or her friend's home, IoT tracker 220 may enter into a battery conservation mode, such as a sleep mode or a PSM, and may not transmit the current location of the child. However, if/when the child leaves those areas, IoT tracker 220 may resume transmitting the location of the child. In some implementations, since the parent may consider the school, the home, and the friend's home to be safe locations for the child, the parent may not need to know the exact location of the child so long as he or she is at one of those locations. However, once the child leaves one of those locations, the user device 210 of the parent may once again begin to receive the current geographic location of IOT tracker 220 (i.e., the child).

Figure 8:
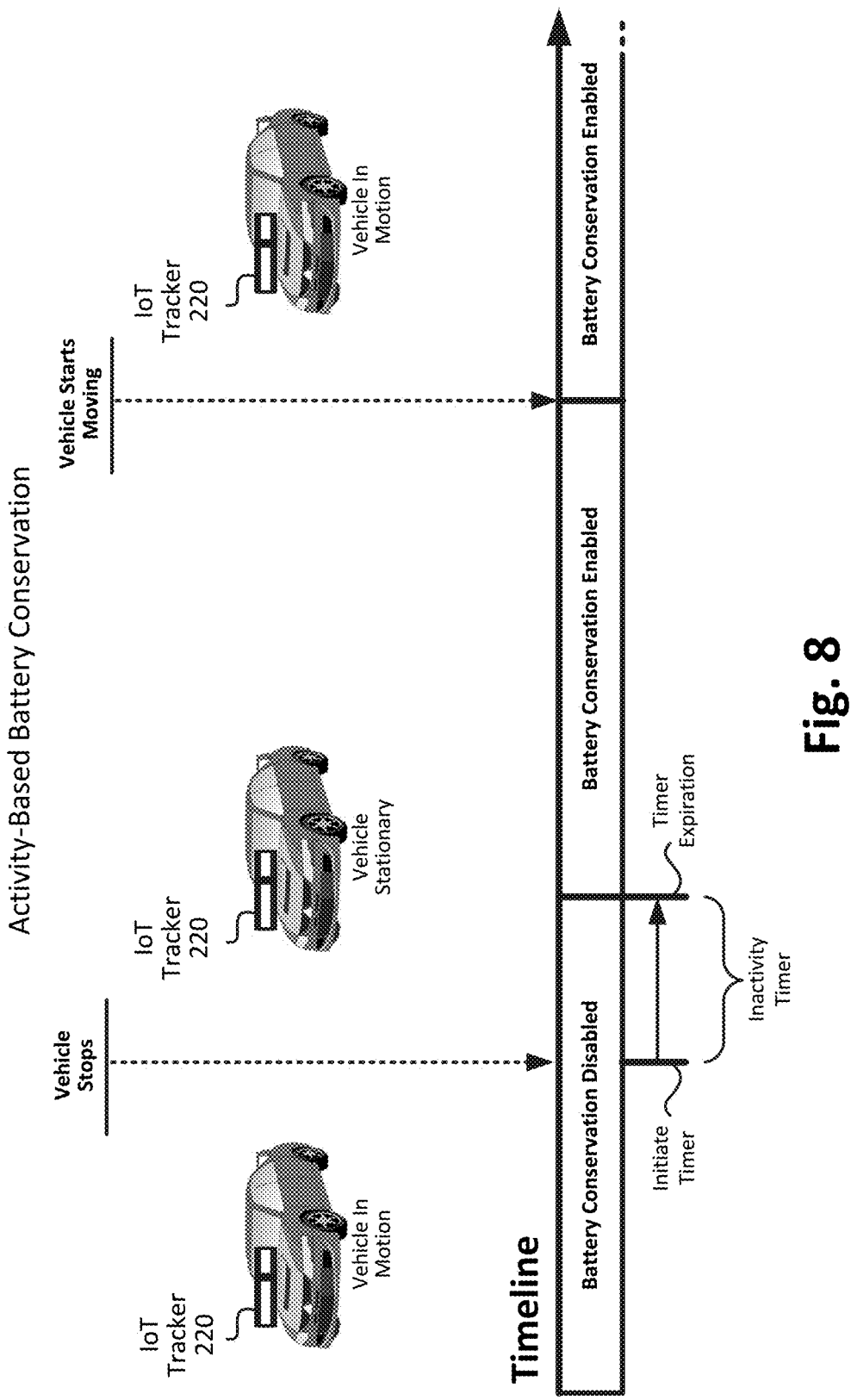
FIG. 8 illustrates an example of an activity-based battery conservation policy.

FIG. 8 illustrates an example of an activity-based battery conservation policy. As shown, the example of FIG. 8 includes a timeline extending from a left-most portion of FIG. 8 to a right-most portion of FIG. 8. The example also includes a vehicle with an IoT tracker 220 installed therein. For purposes of FIG. 8, assume that IoT tracker 220 is not able to use a battery of the vehicle, but instead is using a battery of IoT tracker 220.

As shown, a vehicle may be in an active state (e.g., being driven from one location to another). IoT tracker 220 may determine that the vehicle is in motion in one or more ways, such as by inputs from an accelerometer of IoT tracker 220, by a vehicle control system of the vehicle informing IoT tracker 220 that the vehicle is moving, etc. As depicted, so long as the vehicle is in motion, IoT tracker 220 may be in an active state (i.e., periodically determining and transmitting the location of IoT tracker 220). At some point, the vehicle may stop, and in response, IoT tracker 220 may initiate a timer. The timer may be long enough for IoT tracker 220 to verify that the vehicle has not merely stopped at a stop sign, a traffic light, etc., but that the vehicle has stopped for what appears will be an extended duration.

Upon expiration of the timer, IoT tracker 220 may enter into a battery conservation mode in order to help preserve the amount of power in the battery of IoT tracker 220. During this time, however, IoT tracker 220 may continue to monitor certain conditions. For example, IoT tracker 220 may continue to monitor an input from an accelerometer of IoT tracker 220. As such, when the vehicle starts to move, IoT tracker 220 may detect that the vehicle is once again moving due to an input from an accelerometer of IoT tracker 220. In response, IoT tracker 220 may exit the battery conservation mode and resume determining a location of IoT tracker 220 and transmitting the location to the network.

Figure 9:
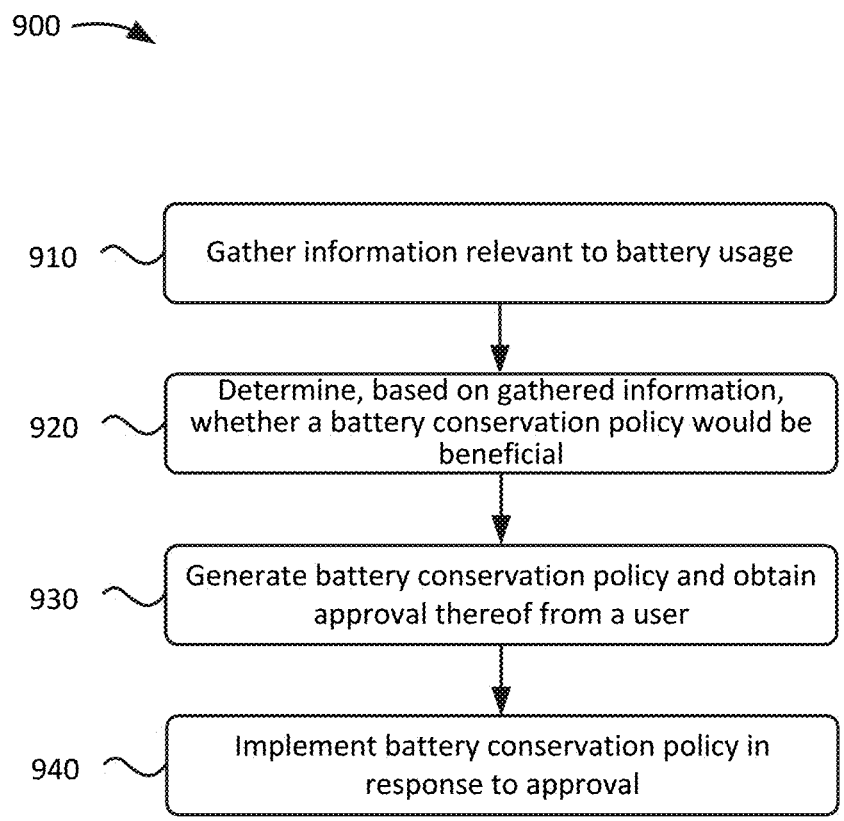
FIG. 9 illustrates an example process for generating a battery conservation policy.

FIG. 9 illustrates an example process 900 for generating a battery conservation policy. In some implementations, process 900 may be implemented by IoT tracker 220.

Process 900 may include gathering information relevant to battery usage (block 910). For example, IoT tracker 220 may gather information that may be relevant to predicting times and places when IoT tracker 220 may benefit from a battery conservation mode. Examples of such information may include historical information relating to patterns, schedules, times, and locations that IoT tracker 220 tends to experience. For instance, IoT tracker 220 may record time, date, and location information over the course of the month, which may include an emphasis on times, dates, and locations where IoT tracker 220 appears to have been stationary. In some implementations, the gathered information may include other types of information as well. Examples of such information may include future plans or scheduling information about meetings, classes, airline travel, etc., also with an emphasis on times, dates, and locations where IoT tracker 220 will likely be stationary. As described below, the information gathered by IoT tracker 220 may be used to determine whether a battery conservation mode may be beneficial at certain times, for certain locations, etc.

Process 900 may include determining, based on the gathered information, whether a battery conservation policy would be beneficial (block 920). For instance, IoT tracker 220 may analyze the information in order to identify behavioral patterns (or future plans) where IoT tracker 220 might benefit from a battery conservation policy. In one example, by analyzing the information, IoT tracker 220 may determine that the IoT tracker 220 is scheduled to be at a particular location (e.g., a school) every Monday from 12:00 PM to 3:00 PM, and since the IoT tracker 220 likely would not be moving much during that time, the IoT tracker 220 may conclude that entering into a battery conservation mode during that time would be beneficial.

Process 900 may include generating a battery conservation policy and obtaining approval thereof from a user (block 910). For example, IoT tracker 220 may create a battery conservation policy based on when IoT tracker 220 would likely benefit from implementing a battery conservation policy. Generating a battery conservation policy may include creating rules, defining triggers and trigger conditions, selecting battery conservation modes, etc. To continue with the example provided above, IoT tracker 220 may generate a battery conservation policy that would cause the IoT tracker 220 to enter into a battery conservation mode between 12:00 PM and 3:00 PM each Monday. In some implementations, the battery conservation policy may require a prerequisite, such as confirming that IoT tracker 220 is actually located at the school. IoT tracker 220 may also, or alternatively, notify a user (e.g., of a UE 210 registered to track the location of the IoT tracker 220) regarding the plan. Doing so may, for example, provide the user with an opportunity to accept or reject the proposed policy.

Process 900 may include implementing a battery conservation proposal in response to an approval thereof. For example, IoT tracker 220 may receive an indication, from the user, that the battery conservation policy has been approved. In response to the approval of the policy, IoT tracker 220 may implement the policy. For instance, once the IoT tracker 220 is located at the school on Monday at 12:00 PM, the IoT tracker 220 may entering into a battery conservation mode in accordance with the battery conservation policy.

Figure 10:
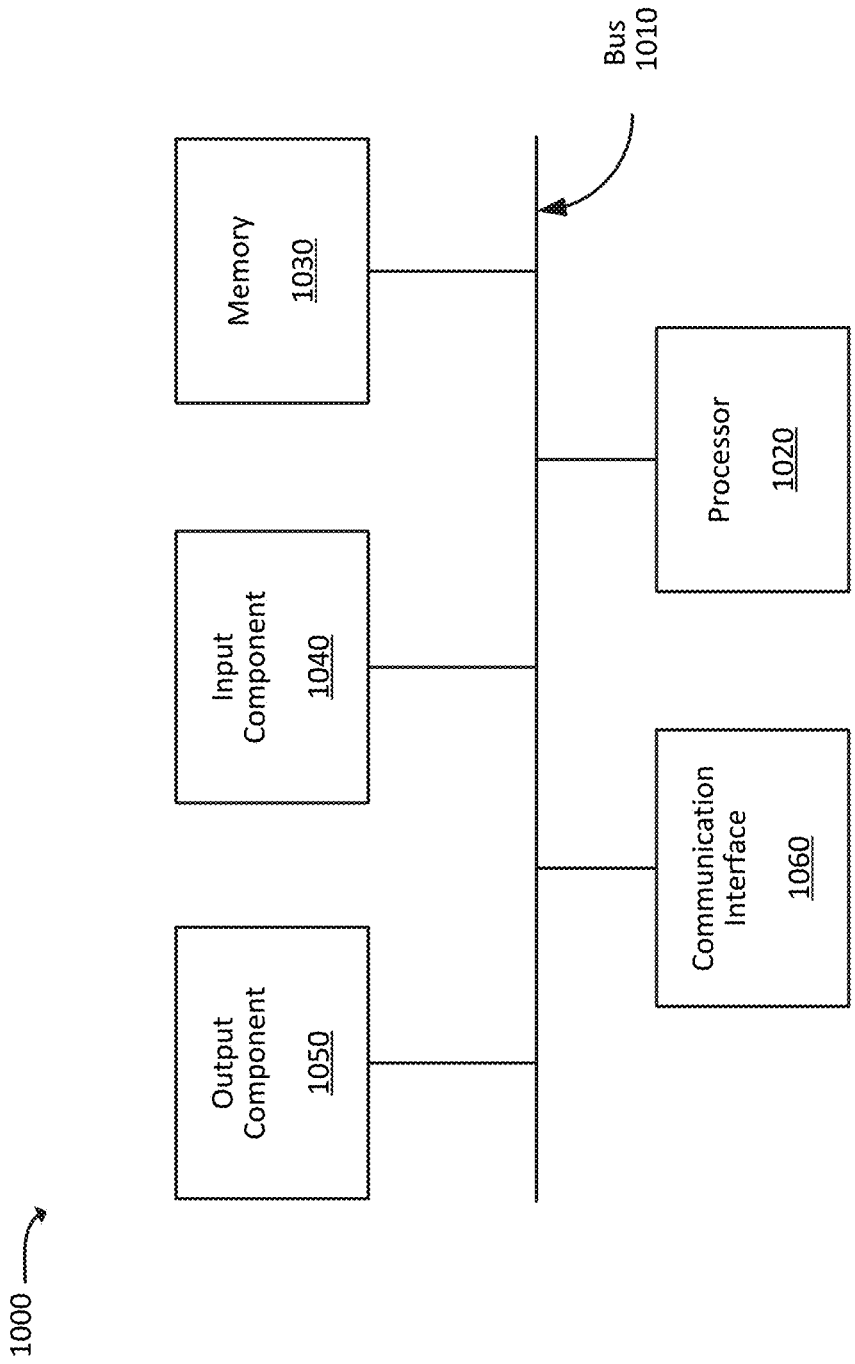
FIG. 10 is a diagram of example components of a device.

FIG. 10 is a diagram of example components of a device 1000. Each of the devices illustrated in FIGS. 1, 2, 5, 7, and 8 may include one or more devices 1000. Device 1000 may include bus 1010, processor 1020, memory 1030, input component 1040, output component 1050, and communication interface 1060. In another implementation, device 1000 may include additional, fewer, different, or differently arranged components. As described herein, a component may be implemented by hardware circuitry, software logic, and/or some combination thereof. Additionally, circuitry, as described herein, may be implemented by hardware, software logic, and/or some combination thereof Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1320 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1, 3, 4, and 9 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   monitor a proximity of the device to a particular User Equipment ("UE");
   determine, based on the monitoring, that a first proximity of the device to the particular UE exceeds a threshold proximity;
   based on determining that the first proximity exceeds the threshold proximity, monitor a geographical location of the device;
   subsequently determine, based on further monitoring of the proximity to the particular UE or based on the monitoring of the geographical location of the device, that a second proximity to the particular UE does not exceed the threshold proximity; and
   based on the subsequent determination that the second proximity to the particular UE does not exceed the threshold proximity, cease monitoring the geographical location of the device.

2. The device of claim 1, wherein ceasing monitoring the geographical location of the device includes entering a power conservation mode.

3. The device of claim 2, wherein the one or more processors are further configured to:
   exit the power conservation mode after entering the power conservation mode, wherein exiting the power conservation mode includes further continuing to monitor the geographical location of the device.

4. The device of claim 2, wherein the power conservation mode is a first power conservation mode, wherein the one or more processors are further configured to:
   exit the first power conservation mode after entering the first power conservation mode;
   determine, after exiting the first power conservation mode, that a particular trigger condition has been met; and
   based on determining that the particular trigger condition has been met, enter a second power conservation mode that is different from the first power conservation mode.

5. The device of claim 4, wherein the second power conservation mode includes a particular interval at which the device monitors a geographical location of the device.

6. The device of claim 1, wherein ceasing to monitor the geographical location of the device consumes less battery power of the device than monitoring, by the device, the geographical location of the device.

7. The device of claim 1, wherein ceasing monitoring the geographical location of the device includes entering a power conservation mode, wherein the one or more processors are further configured to:
   exit the power conservation mode after entering the power conservation mode, wherein exiting the power conservation mode includes further continuing to monitor the geographical location of the device;
   determine, after exiting the power conservation mode, that a measure of acceleration associated with the device is below a threshold measure of acceleration; and
   enter the power conservation mode based on determining that the measure of acceleration associated with the device is below the threshold measure of acceleration.

8. A non-transitory computer-readable medium, storing a plurality of processor-executable instructions to:
   monitor a proximity of a device to a particular User Equipment ("UE");
   determine, based on the monitoring, that a first proximity of the device to the particular UE exceeds a threshold proximity;
   based on determining that the first proximity exceeds the threshold proximity, cause the device to monitor a geographical location of the device;
   subsequently determine, based on further monitoring of the proximity to the particular UE or based on the monitoring of the geographical location of the device, that a second proximity to the particular UE does not exceed the threshold proximity; and based on the subsequent determination that the second proximity to the particular UE does not exceed the threshold proximity, cause the device to cease monitoring the geographical location of the device.

9. The non-transitory computer-readable medium of claim 8, wherein ceasing monitoring the geographical location of the device includes entering a power conservation mode.

10. The non-transitory computer-readable medium of claim 9, wherein the plurality of processor-executable instructions further include processor-executable instructions to:

cause the device to exit the power conservation mode after entering the power conservation mode, wherein exiting the power conservation mode includes further continuing to monitor the geographical location of the device.

11. The non-transitory computer-readable medium of claim 9, wherein the power conservation mode is a first power conservation mode, wherein the plurality of processor-executable instructions further include processor-executable instructions to:

exit the first power conservation mode after entering the first power conservation mode;

determine, after the device exits the first power conservation mode, that a particular trigger condition has been met; and based on determining that the particular trigger condition has been met, cause the device enter a second power conservation mode that is different from the first power conservation mode.

12. The non-transitory computer-readable medium of claim 11, wherein the second power conservation mode includes a particular interval at which the device monitors a geographical location of the device.

13. The non-transitory computer-readable medium of claim 8, wherein ceasing to monitor the geographical location of the device consumes less battery power of the device than monitoring, by the device, the geographical location of the device.

14. The non-transitory computer-readable medium of claim 8, wherein ceasing monitoring the geographical location of the device includes entering a power conservation mode, wherein the plurality of processor-executable instructions further include processor-executable instructions to:

cause the device to exit the power conservation mode after entering the power conservation mode, wherein exiting the power conservation mode includes further continuing to monitor the geographical location of the device;

determine, after exiting the power conservation mode, that a measure of acceleration associated with the device is below a threshold measure of acceleration; and cause the device to enter the power conservation mode based on determining that the measure of acceleration associated with the device is below the threshold measure of acceleration.

15. A method, comprising:

monitoring a proximity of a device to a particular User Equipment ("UE");

determining, based on the monitoring, that a first proximity of the device to the particular UE exceeds a threshold proximity;

based on determining that the first proximity exceeds the threshold proximity, monitoring a geographical location of the device;

subsequently determining, based on further monitoring of the proximity to the particular UE or based on the monitoring of the geographical location of the device, that a second proximity to the particular UE does not exceed the threshold proximity; and based on the subsequent determination that the second proximity to the particular UE does not exceed the threshold proximity, ceasing monitoring the geographical location of the device.

16. The method of claim 15, wherein ceasing monitoring the geographical location of the device includes entering a power conservation mode.

17. The method of claim 16, further comprising:

exiting the power conservation mode after entering the power conservation mode, wherein exiting the power conservation mode includes further continuing to monitor the geographical location of the device.

18. The method of claim 16, wherein the power conservation mode is a first power conservation mode, the method further comprising:

exiting the first power conservation mode after entering the first power conservation mode;

determining, after exiting the first power conservation mode, that a particular trigger condition has been met; and based on determining that the particular trigger condition has been met, entering a second power conservation mode that is different from the first power conservation mode, wherein the second power conservation mode includes a particular interval at which the device monitors a geographical location of the device.

19. The method of claim 15, wherein ceasing to monitor the geographical location of the device consumes less battery power of the device than monitoring the geographical location of the device.

20. The method of claim 15, wherein ceasing monitoring the geographical location of the device includes entering a power conservation mode, the method further comprising:

exiting the power conservation mode after entering the power conservation mode, wherein exiting the power conservation mode includes further continuing to monitor the geographical location of the device;

determining, after exiting the power conservation mode, that a measure of acceleration associated with the device is below a threshold measure of acceleration; and entering the power conservation mode based on determining that the measure of acceleration associated with the device is below the threshold measure of acceleration.

* * * * *